United States Patent
Grob et al.

(10) Patent No.: US 7,521,035 B1
(45) Date of Patent: Apr. 21, 2009

(54) METHOD FOR REGENERATING A RESIDUAL SUBSTANCE THAT CONTAINS SULFUR AND AN ATOMIZING BURNER SUITED FOR CARRYING OUT SAID METHOD

(75) Inventors: Gerhard Grob, Willich (DE); Heinz Gruning, Biblis (DE)

(73) Assignees: Messer Griesheim GmbH (DE); Roehm GmbH & Co. KG (DE)

( * ) Notice: Subject to any disclaimer, the term of this patent is extended or adjusted under 35 U.S.C. 154(b) by 964 days.

(21) Appl. No.: 10/380,386

(22) PCT Filed: Sep. 7, 2001

(86) PCT No.: PCT/EP01/10346

§ 371 (c)(1),
(2), (4) Date: Oct. 28, 2003

(87) PCT Pub. No.: WO02/23088

PCT Pub. Date: Mar. 21, 2002

(51) Int. Cl.
*C01B 17/00* (2006.01)
(52) U.S. Cl. .................. 423/512.1; 138/114; 75/530
(58) Field of Classification Search ............... 423/512.1
See application file for complete search history.

(56) References Cited

U.S. PATENT DOCUMENTS

| 4,062,657 A | * | 12/1977 | Knuppel et al. | ........... 48/77 |
| 4,827,486 A | * | 5/1989 | Brotzmann et al. | ........... 373/2 |
| 4,853,206 A | * | 8/1989 | Watson | ........... 423/542 |

* cited by examiner

*Primary Examiner*—Steven Bos
*Assistant Examiner*—Paul Wartalowicz
(74) *Attorney, Agent, or Firm*—Connolly Bove Lodge & Hutz

(57) ABSTRACT

A method for the regeneration of residues containing sulphur is characterized in that a droplet stream containing fuel is introduced into the reactor simultaneously with the droplet stream containing the residue and is fed into a pre-reaction zone that is created by feeding in an oxygen-rich gas stream, whereby the residue in the pre-reaction zone is partially thermally cleaved and subsequently fed into the reaction zone.

14 Claims, 3 Drawing Sheets

Figure 1:
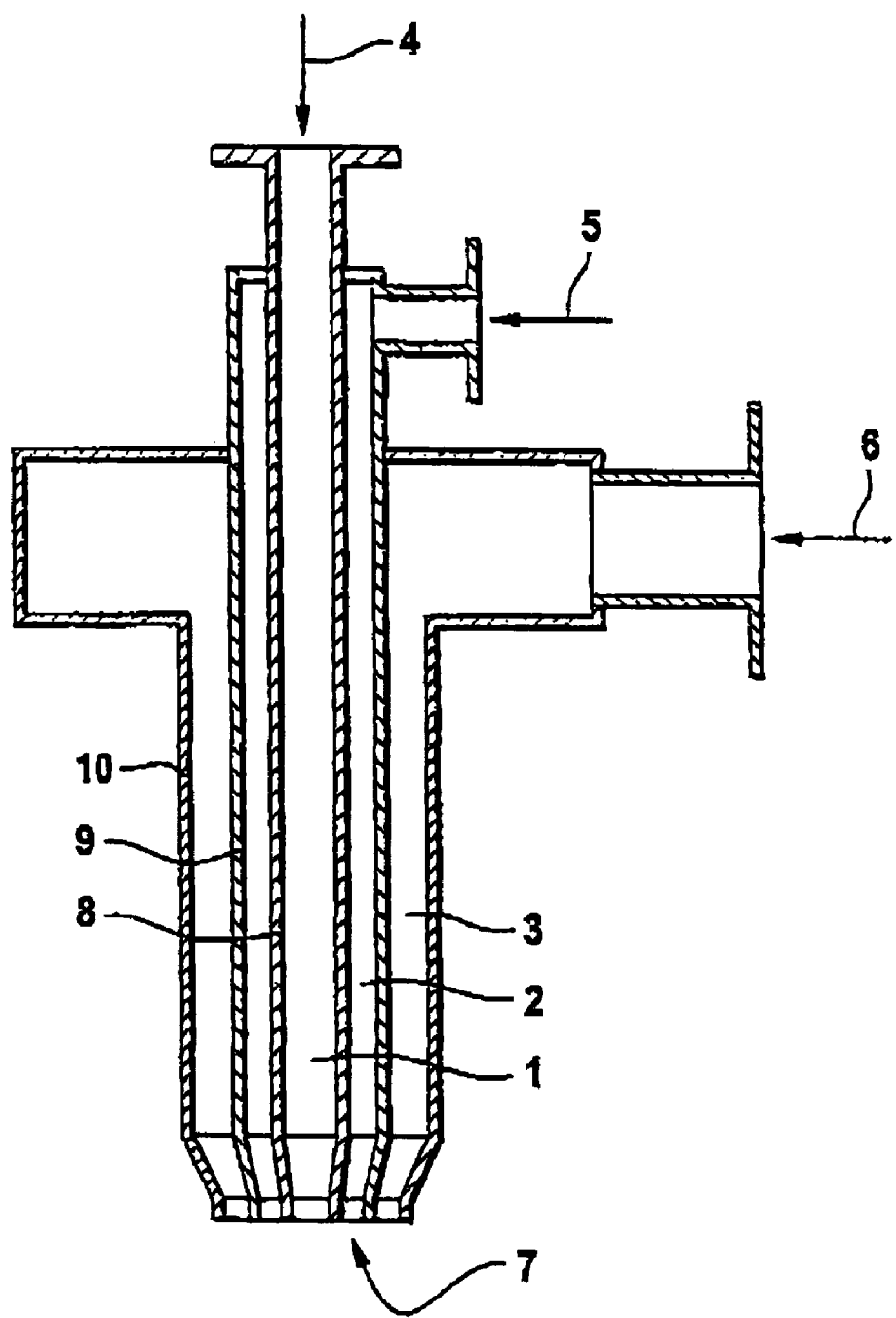

METHOD FOR REGENERATING A RESIDUAL SUBSTANCE THAT CONTAINS SULFUR AND AN ATOMIZING BURNER SUITED FOR CARRYING OUT SAID METHOD

The present invention relates to a method for the regeneration of residues containing sulfur in that a droplet stream containing the residue is introduced into a reactor and fed to a reaction zone consisting of hot flue gases that are generated by the combustion of a fuel, and heated in said reaction zone so that the compounds of the residues containing sulfur are thermally cleaved.

Furthermore, the invention relates to an atomizing burner for executing the method, comprising a central inner nozzle that serves to feed in the residues containing sulfur and that is surrounded by an outer nozzle.

According to the state of the art, residues containing sulfur such as, for example, spent sulfuric acids (so-called "waste sulfuric acids") or ammonia sulfate solutions, are treated by means of thermal cleavage in so-called cleaving installations. In this process, the residues are fed into a heating zone of a reactor with a refractory lining, hereinafter referred to as a "cleaving oven", said heating zone being created by hot flue gases, where these residues are thermally cleaved under formation of sulfur dioxide. The heating zone is created by burning a fuel with an oxidant that contains oxygen. The process gases containing sulfur dioxide are further processed according to the state of the art into sulfuric acid, fuming sulfuric acid or sulfur dioxide.

Two different types of reactors are commonly used, which differ primarily in terms of the process gas flow, namely, cleaving ovens with a vertical or with a horizontal flow.

In the case of cleaving ovens with a vertical flow, the burners for generating the hot flue gases are flanged directly onto the oven wall radially or tangentially in one or more planes. The flame first develops in the cleaving oven, whereby CO and soot might form as a result of incomplete combustion, and there is a risk that the sulfuric acid produced could acquire a brown coloration. Therefore, the more modern cleaving installations are equipped with upstream combustion chambers, called combustors, rather than with the directly flanged-on burners. Combustors generate a hot, fully reacted flue gas at a temperature of about 2000° C. [3632° F.].

With the horizontally arranged cleaving oven, usually one or more burners or combustors are flanged directly onto the end wall. The flame or the flue gas exit horizontally.

Examples of possible fuels are combustible gases and liquid fuels, preferably with a high sulfur content, such as, for example, fuel oil. If there is a need to increase the sulfuric acid production, liquid sulfur is also added as the fuel, and it burns directly in the cleaving oven to form sulfur dioxide. The oxidation medium normally used is air, which is either added to the burner box at the ambient temperature or else recuperatively heated.

The acid is fed into the cleaving oven by means of pressure atomizers, compressed-air atomizers or rotary atomizers that are made of acid-proof materials.

All cleavage methods have in common the requisite very high cleavage temperature of 900° C. to 1200° C. [1652° F. to 2192° F.] at which the residues containing sulfur are converted into sulfur dioxide, water vapor, oxygen and optionally nitrogen and carbon dioxide. The strong endothermic cleavage reaction takes place in the cleaving ovens described above, requiring large amounts of energy in the form of combustible gas or oil. Thus, for example, theoretically, about 1770 KWh of energy per ton of waste acid are needed for the cleavage of a 70%-solution of waste sulfuric acid, consisting of 70% sulfuric acid and 30% water.

When air is used as the oxidant, the inert nitrogen fraction also has to be heated to the cleavage temperature of about 1000° C. [1832° F.], thus additionally raising the energy consumption and reducing the sulfur dioxide concentration as well as increasing the process gas volume.

In principle, the specific disposal costs per ton of waste acid can be reduced by increasing the sulfur dioxide concentration in the process gas.

Higher sulfur dioxide concentrations can be achieved either by concentrating the residues containing sulfur in a separate installation or by reducing the inert nitrogen fraction in the combustion air, which is normally achieved by using oxygen as the oxidation medium.

In order to mix oxygen with the fuels in the cleaving oven, so far, the following methods have proven their worth in actual practice:

enrichment of the combustion air with oxygen,
injection of oxygen into the air flame,
use of a fuel/oxygen burner.

As a result of the oxygen enrichment and/or the oxygen injection, the flame temperature rises, which can cause damage to the burners and/or to the refractory lining.

During the oxygen enrichment as well as during the oxygen injection, the temperature of the flame is raised, thus promoting the thermal formation of nitrogen oxide, which is fundamentally disadvantageous for the cleaving process.

When a fuel/oxygen burner is used, fuels such as oil or combustible gas are burned by means of a suitable burner, while being mixed externally with oxygen. The oxygen burners can additionally be integrated into the reactor so as to improve the performance of an existing cleaving oven, or else to replace air burners. The very high flame temperatures of up to 2900° C. [5252° F.] give rise to the same problems as with the previously mentioned methods. Moreover, water-cooled oxygen burners are maintenance-intensive since corrosion damage can occur on the cooled surfaces due to the condensation of sulfuric acid.

Owing to these drawbacks, the use of oxygen to improve the performance of cleaving installations used for regenerating residues containing sulfur has only been possible to a limited extent. Thus, for example, cleaving ovens that were equipped with combustors could not be operated with oxygen until now because the oxygen enrichment as well as the oxygen injection cause the flame temperature to rise so that the refractory lining of the combustor, which is already being operated at its upper temperature limit, melts and moreover, due to the increased formation of nitrogen oxide, the quality of the produced sulfuric acid is greatly diminished due to elevated content of nitrosyl sulfuric acid.

Therefore, the present invention is based on the objective of providing a method for the regeneration of residues containing sulfur in which oxygen can be introduced into the cleavage oven without the above-mentioned drawbacks and limitations as an additional oxidation medium in order to enhance the performance and improve the cost-effectiveness. Moreover, the invention is based on the objective of providing a suitable atomizing burner with a long service life for executing the process.

When it comes to the method, this objective, based on the method described above, is achieved according to the invention in that a droplet stream containing fuel is fed into the reactor simultaneously with the droplet stream containing the residue, and is introduced into a pre-reaction zone that is created by feeding in an oxygen-rich gas stream, whereby the residue in the pre-reaction zone is partially thermally cleaved and subsequently fed into the reaction zone.

The droplet stream containing the residue and the droplet stream containing the fuel are fed into a pre-reaction zone. This zone is created in that finely distributed residue and fuel react with the oxygen-rich gas. In the pre-reaction zone, the residue containing sulfur is partially cleaved and subsequently fed into the reaction zone having a higher temperature and consisting of the hot flue gases. The pre-reaction zone is thus separate from the actual reaction zone. As a result, the additional energy needed in the pre-reaction zone to enhance the performance can be supplied without this causing an increase in the flame temperature in the actual reaction zone and hence without exceeding the temperature limits in this area or else increasing the formation of nitrogen oxide.

The pre-reaction zone is created in that fuel is burned there with the oxygen-rich gas stream. The fuels for forming the pre-reaction zone and the actual reaction zone can be identical. The oxygen-rich gas stream consists of pure oxygen or of an oxygen-air mixture with an oxygen concentration between 25 vol.-% and 100 vol.-%.

Due to the joint introduction of the residue and of the fuel into the pre-reaction zone and the partial cleavage of the residue, the thermal cleavage of the residue can be carried out in the actual reaction zone at low reaction temperatures, which translates into a low formation of nitrogen oxide at high reaction rates in the overall process. The reaction products from the pre-reaction zone that had not yet been completely cleaved are transferred to the actual reaction zone having a higher temperature, where the complete cleavage and combustion of the reaction products takes place without the additional formation of nitrogen oxide.

Preferably, a maximum temperature in the range between 800° C. and 1300° C. [1472° F. and 2372° F.], especially preferred between 850° C. and 1100° C. [1562° F. and 2012° F.], is set in the pre-reaction zone. This ensures that a low thermal load on the refractory lining and a low thermal nitrogen oxide formation. The temperature in the pre-reaction zone can be regulated by separately setting the volume flows of the residue containing sulfur, the fuel and the oxygen-rich gas. These are set independently of each other in such a way that the temperature in the pre-reaction zone lies within the above-mentioned preferred temperature ranges.

Preferably, a reducing atmosphere is maintained in the first reaction zone in that the oxygen content in the pre-reaction zone is set sub-stoichiometrically with respect to the oxidizable components of the residue and of the fuel.

In particular, a method in which the residue and fuel are introduced into the reactor by means of an atomizing medium has proven its worth, whereby the atomizing medium is formed at least partially by the oxygen-rich gas stream. Otherwise, it is also possible to use, for example, compressed air or steam as the atomizing medium. The term atomizing medium here is defined as the media that are supplied to the atomizer and that directly or indirectly contribute to the atomization of the residue and the fuel. In particular, this also refers to such media that are supplied to the atomizer with the objective of surrounding the atomization cone that is forming during the atomization. Pressure atomizers, rotary atomizers or injector atomizers are used as the atomizers.

Advantageously, a residue-fuel mixture in the form of residue-fuel droplet stream is fed into the reactor. In this context, the residue-fuel mixture is created outside of the reactor. This mixture is supplied to an atomizer in order to form the residue-fuel droplet stream and then the mixture is introduced into the pre-reaction zone by the atomizer. The oxygen-rich gas stream is fed into the pre-reaction zone together with this mixture or else separately.

It has been found that it is especially advantageous for the oxygen-rich gas stream to surround and penetrate the residue-fuel droplet stream as a sheathing gas stream, thus creating the first reaction zone. The sheathing gas stream in this context is completely or partially formed by the oxygen-rich gas stream or by part thereof. Here, the sheathing gas stream is also advantageously used partially or entirely as the secondary atomizing medium for the residue-fuel mixture.

A configuration of the method according to the invention that has especially proven its worth is one in which the sheathing gas stream is partially made up of an air stream, whereby the oxygen content in the sheathing gas stream is set between 25 vol.-% and 100 vol.-%. The oxygen content in the sheathing gas stream is set as a function of the ratio of the flow volumes of the air stream to the oxygen-rich gas stream and its oxygen content.

Moreover, it has proven to be advantageous to atomize the residue using an atomizing burner having a central inner nozzle that feeds in the residue-fuel mixture and that is coaxially surrounded by an inert gas nozzle and by a ring-shaped nozzle that feeds the oxygen-rich sheathing gas stream, whereby inert gas is fed through the inert gas nozzle. The inert gas fed through the inert gas nozzle serves to protect the central inner nozzle from the oxygen-rich sheathing gas stream. Consequently, the inner nozzle can be made of a material that would oxidize readily at the prevailing high temperatures if it comes into contact with the oxygen-rich sheathing gas stream.

In an especially preferred embodiment of the method according to the invention, the oxygen-rich gas stream comprises a pre-heated hot air stream and an oxygen-rich gas stream that is handled separately from it. The oxygen content of the oxygen-rich gas stream is preferably at least 80 vol.-%.

As far as the atomizing burner is concerned, on the basis of the atomizing burner described above, the objective set forth is achieved according to the invention in that, between the inner nozzle and the outer nozzle, there is an inert gas nozzle that coaxially surrounds the inner nozzle, and in that the inner nozzle is connected to an inlet for a residue-fuel mixture and the outer nozzle is connected to an inlet for an oxygen-rich gas stream.

In the atomizing burner according to the invention, there is an inert gas nozzle between the inner nozzle and the outer nozzle. The inert gas nozzle surrounds the inner nozzle coaxially. As a result, an inert gas can be fed in through the inert gas nozzle, whereby said inert gas is inert vis-à-vis the inner nozzle and it protects the inner nozzle from the outside environment. This, in turn, means that it is it possible to make the inner nozzle out of a material that is resistant to the residues containing sulfur, but that is not stable vis-à-vis the medium coming out of the outer nozzle.

In the atomizing burner according to the invention, the inner nozzle is connected to an inlet for a residue-fuel mixture, and the outer nozzle is connected to an inlet for an oxygen-rich gas stream. As already explained above with reference to the method according to the invention, the oxygen-rich gas stream as set forth in the present invention has an oxygen content between 25 vol.-% and 100 vol.-%. An in-depth description has been given above on the effect of feeding in this gas stream in order to improve the performance of the regeneration of residues containing sulfur in a reactor, in conjunction with feeding in a residue-fuel mixture thus creating a pre-reaction zone in the reactor.

The atomizing burner according to the invention makes it possible to atomize the residue while feeding in an oxygen-rich gas stream or a part thereof through the outer nozzle, whereby the inner nozzle can be protected from the oxygen-rich gas stream by feeding in a suitable inert gas through the inert gas nozzle. Consequently, the inner nozzle can be made of a material that would otherwise be susceptible to corrosion under the ambient conditions.

Preferably the inner nozzle is made of zirconium. Zirconium stands out for its high acid resistance and durability, but at high temperatures (for example, at 1000° C. [1832° F.]), due to its affinity, it oxidizes readily or might even be ignited in pure oxygen, which is prevented by the medium fed in through the inert gas nozzle.

Another improvement of the atomizing burner according to the invention consists in that there are swirling devices in the outer nozzle. In the method according to the invention, the swirling devices bring about an additional secondary atomization of the residue-fuel mixture.

An especially simple embodiment of the atomizing burner is one in which the outer nozzle is configured as an annular gap that coaxially surrounds the inert gas nozzle.

In an alternative and likewise preferred embodiment, the outer nozzle is configured as an annular gap in which a plurality of individual nozzles are distributed along the outer perimeter of the inert gas nozzle. With this embodiment of the atomizing burner, a first gas can be fed in through the annular gap and a second gas through the individual nozzles. For example, the first gas can be preheated air and the second gas can be an oxygen-rich gas stream as set forth in this invention, having an oxygen content of preferably at least 80 vol.-%.

Figure 2:
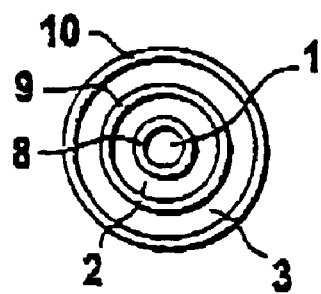
Figure 3:
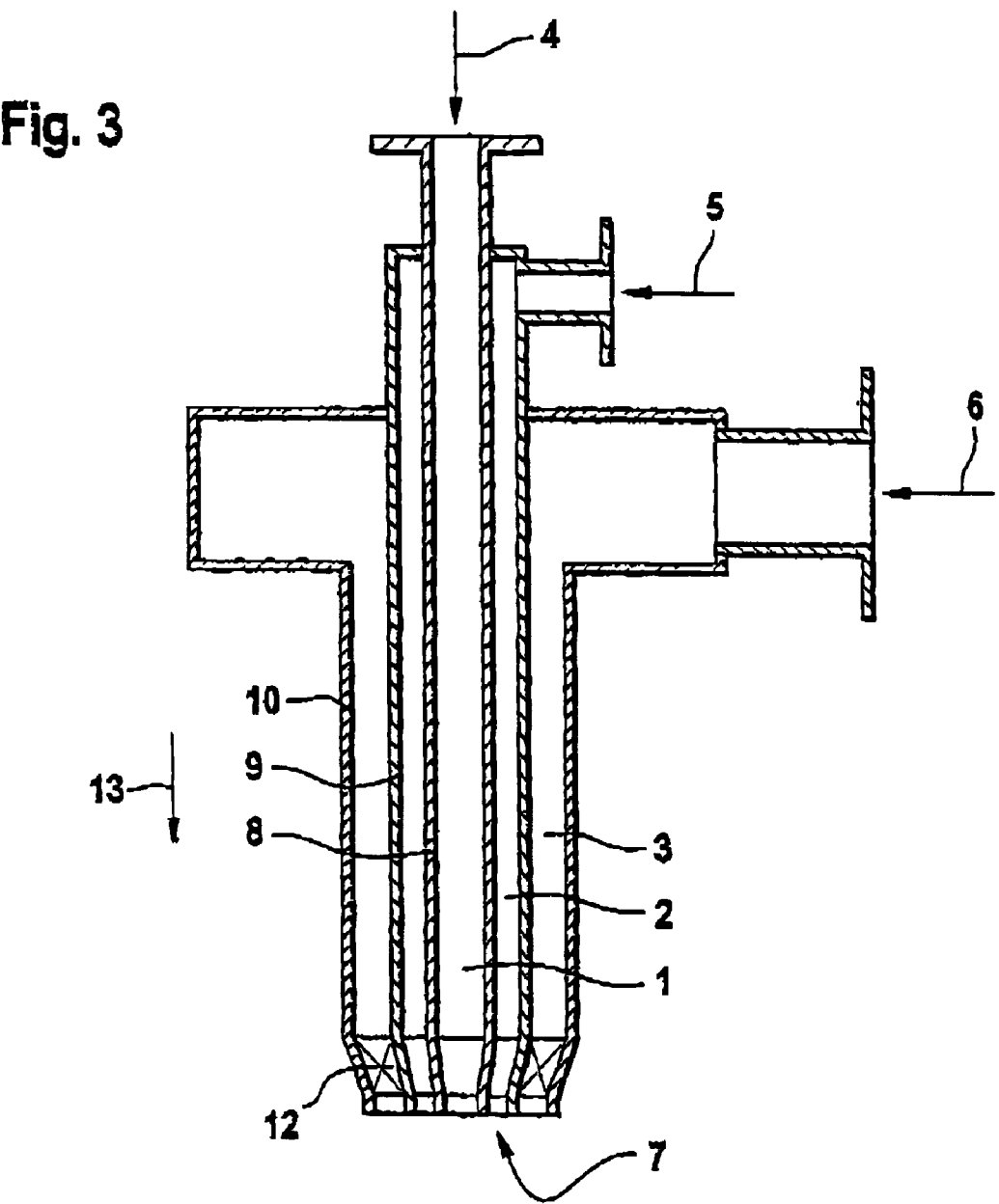
Figure 4:
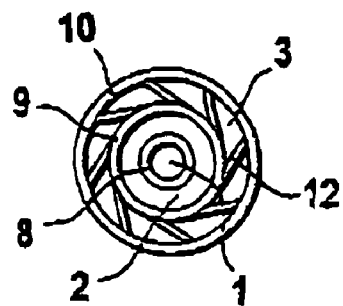
Figure 5:
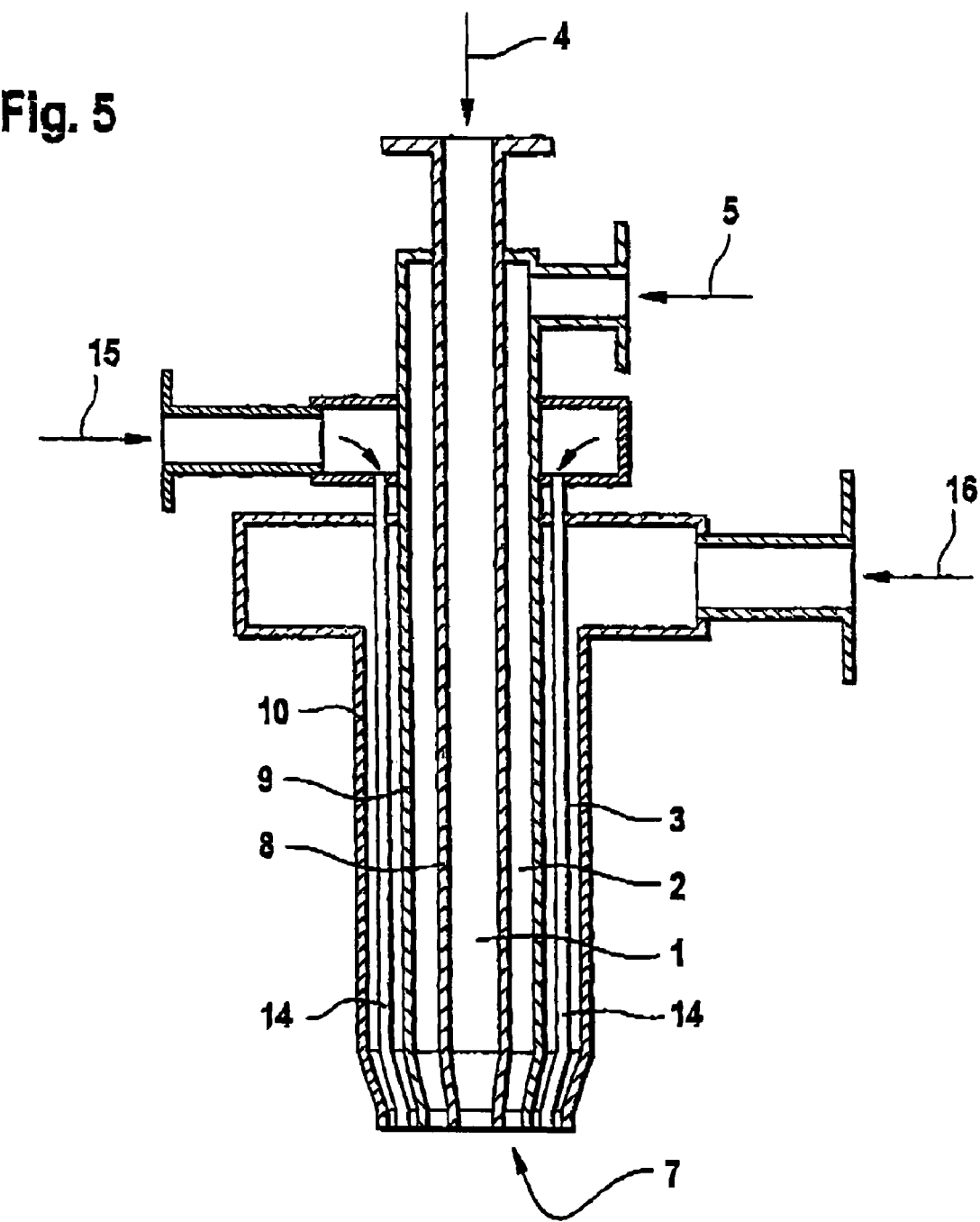
Figure 6:
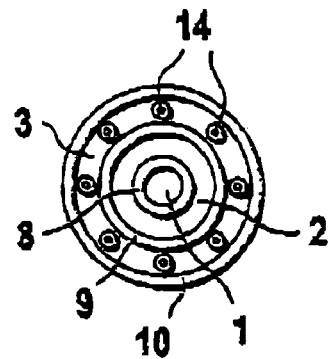

Below, the invention will be explained in greater depth with reference to embodiments and a drawing. The drawing shows the following in detail:

FIG. 1—the atomizing burner according to the invention in a first embodiment,

FIG. 2—the atomizing burner according to FIG. 1 in a top view of the opening of the atomizing nozzle, FIG. 3—a second embodiment of the atomizing burner according to the invention having an outer nozzle fitted with a swirling device, FIG. 4—the atomizing burner according to FIG. 3 in a top view of the opening of the atomizing nozzle, FIG. 5—a third embodiment of the atomizing burner according to the invention having an outer nozzle with individual nozzles arranged therein, and FIG. 6—the atomizing burner according to FIG. 5 in a top view of the opening of the atomizing nozzle.

The atomizing burner shown in FIG. 1 has a central inner nozzle 1 that is coaxially surrounded by a ring-shaped gas separation nozzle 2 and by another ring-shaped outer nozzle 3. The inner nozzle 1 has an inlet 4 for a mixture of residues containing sulfur and fuel such as, for example, light oil or heavy fuel oil, waste oil or solvent, the gas separation nozzle 2 is provided with an air inlet 5 and the outer nozzle 3 is provided with an inlet 6 for an oxygen-air mixture whose oxygen content can be varied between 20.6 vol.-% and 100 vol.-%.

The inner nozzle is formed by a tube 8 made of zirconium that is tapered conically in the direction of the nozzle opening 7. The remaining walls of the nozzles (2; 3) consists of heat-proof, sulfur-resistant, high-alloy stainless steel in the form of two coaxial tubes (9; 10).

Insofar as the same reference numerals are used in the representations of FIGS. 2 to 6 as those used in FIG. 1, these refer to identical or equivalent parts or components of the atomizing burner according to the invention as they have already been explained with reference to FIG. 1.

The top view of the atomizing burner according to FIG. 2 shows the coaxial arrangement of the individual tubes (8; 9; 10) and of the nozzles (1, 2, 3) of the atomizing burner according to FIG. 1.

In the embodiment of the atomizing burner according to the invention shown in FIG. 3, in the lower area of the outer nozzle 3, just before the nozzle opening 7, there is a swirling device in the form of lamellae 12 that are set up inside the outer nozzle 3 at a slant in the flow direction 13.

The top view of the atomizing burner according to FIG. 4 shows the coaxial arrangement of the individual tubes (8; 9; 10) and of the nozzles (1, 2, 3) as well as the lamellae 12 inside the outer nozzle 3 of the atomizing burner according to FIG. 3.

FIG. 5 shows an embodiment of the atomizing burner according to the invention in which, inside the ring-shaped outer nozzle 3, a plurality of individual nozzles 14 (in the embodiment, there are eight individual nozzles 14) are arranged in a circular cross section. The individual nozzles 14 are uniformly distributed around the gas separation nozzle 2. They consist of tubes made of austenitic material whose upper end facing away from the nozzle opening 7 is connected to an oxygen inlet 15. In this atomizing burner, the outer nozzle 3 is connected to an inlet 16 for hot air.

Through this arrangement of the individual nozzles, the oxygen is separated from the preheated oxygen-air mixture until the nozzle opening 7. In this manner, any desired amount of oxygen or air can be safely fed into the oven.

The top view of the opening of the atomizing nozzle according to FIG. 6 shows the coaxial arrangement of the individual tubes (8; 9; 10) and of the nozzles (1, 2, 3) as well as the arrangement of the circular individual nozzles 14 around the gas separation nozzle 2 in the atomizing burner according to FIG. 5.

The advantages of the method according to the invention will be explained in greater detail with respect to the examples without this constituting a limitation of the scope of the invention.

COMPARATIVE EXAMPLE 1

In order to cleave residues containing sulfur, an existing cleaving installation having a cleaving oven with a vertical flow is used; here, the residues are injected at the oven head and the process gas flows through the cleaving oven from the top to the bottom. The cleaving oven is fired with heavy fuel oil S as the fuel and pre-heated air as the oxidation medium by means of two tangentially arranged combustors.

The residue that is injected from the top by the atomizing nozzle is thermally cleaved in the hot flue gases generated by the combustors.

The residue used was 12 m³/h of a waste acid from the production of methyl methacrylate having the following composition:

41.3% by weight of sulfuric acid
27.5% by weight of ammonia sulfate
27.5% by weight of water
3.7% by weight of organic substances.

The atomization is carried out with a conventional atomizing nozzle. In this case, the fed-in residue quantity of 12 m³/h corresponds to the maximum capacity of the installation. The results achieved are compiled in bulleted form below.

TABLE 1

Results (Comparative Example 1)

| | |
|---|---|
| throughput rate of residue containing sulfur: | 12 m³/h |
| fuel throughput rate: | 1700 kg/h |
| air throughput rate: | 27,000 m³/h (under standard conditions) |
| oxygen throughput rate: | 0 m³/h (under standard conditions) |
| temperature at oven head: | 890° C. [1634° F.] |
| temperature at oven outlet: | 1000° C. [1832° F.] |
| $SO_2$ concentration in the reaction gas: | 8.3 vol.-%, dry |
| $NO_x$ concentration in the reaction gas: | 140 mg/m³ (under standard conditions), dry |
| $SO_3$ concentration in the reaction gas: | 8.8 mg/m³ (under standard conditions), dry |

EXAMPLE 1

For the experiments according to the invention, the same cleaving oven was used as for Comparative Example 1, but equipped with the burner according to the invention described in FIGS. 1 and 2.

The same residue containing sulfur with the identical residue feed as in Comparative Example 1 was used. Pure oxygen was blown into the reaction chamber via the concentric atomizing nozzle 3.

With an oxygen throughput rate of 1000 m³/h, the fuel and air volumes in the combustors were reduced and, at the same time, 420 kg/h of heavy fuel oil S were admixed with the residue containing sulfur and sprayed in a finely distributed form into the pre-reaction zone by means of the oxygen atomizing burner according to the invention. The droplet cone of the residue-fuel mixture was sheathed and penetrated by the oxygen stream generated by means of the concentric nozzle 3, thus creating the pre-reaction zone. The complete thermal cleavage takes place in the reaction zone in the hot flue gas stream that was generated in the combustors. The comparison of the $SO_3$ values to those of Comparative Example 1 shows that the thermal cleavage of the residues took place completely.

Due to the reduced process gas volume flow, the $SO_2$ concentration in the reaction gas increases from 8.3 vol.-% to 10.4 vol.-%. The temperatures at the oven head and at the oven outlet were virtually identical. The nitrogen oxide values measured in the reaction gas at the oven outlet do not reveal any increase with respect to Comparative Example 1. The results achieved are compiled in bulleted form below.

TABLE 2

Results (Example 1)

| | |
|---|---|
| throughput rate of residue containing sulfur: | 12 m³/h |
| fuel throughput rate: | 1620 kg/h |
| air throughput rate: | 21,000 m³/h (under standard conditions) |
| oxygen throughput rate: | 1000 m³/h (under standard conditions) |
| temperature at oven head: | 868° C. [1594.4° F.] |
| temperature at oven outlet: | 1002° C. [1835.6° F.] |
| $SO_2$ concentration in the reaction gas: | 10.4 vol.-%, dry |
| $NO_x$ concentration in the reaction gas: | 165 mg/m³ (under standard conditions), dry |
| $SO_3$ concentration in the reaction gas: | 8.8 mg/m³ (under standard conditions), dry |

EXAMPLE 2

In Example 3, with the same composition of the residue as in Example 1, the throughput rate of residue containing sulfur was increased by 33.3%, from 12 m³/h to 16 m³/h. The oxygen volume was 2000 m³/h. The energy needed for the additional cleavage was fed via the atomizing burner according to the invention, which is shown in FIGS. 1 and 2, by admixing 510 kg/h of heavy heating oil S with the residue containing sulfur and introduced into the pre-reaction zone. In spite of the elevated throughput rate, the degree of cleavage was only slightly higher, as can be seen on the basis of the $SO_3$ values. No increase in the temperature at the oven head was observed. The temperature at the cleaving oven outlet was constant. Vis-à-vis Comparative Example 1, with a virtually constant process gas volume flow, the $SO_2$ concentration rose from 8.3 vol.-% to 11.4 vol.-%. The nitrogen oxide concentration was somewhat lower relative to the $SO_2$ content. The results obtained are compiled in bulleted form below.

TABLE 3

Results (Example 2)

| | |
|---|---|
| throughput rate of residue containing sulfur: | 16 m³/h |
| fuel throughput rate: | 2020 kg/h |
| air throughput rate: | 23,500 m³/h (under standard conditions) |
| oxygen throughput rate: | 2000 m³/h (under standard conditions) |
| temperature at oven head: | 872° C. [1601.6° F.] |
| temperature at oven outlet: | 1000° C. [1832° F.] |
| $SO_2$ concentration in the reaction gas: | 11.4 vol.-%, dry |
| $NO_x$ concentration in the reaction gas: | 180 mg/m³ (under standard conditions), dry |
| $SO_3$ concentration in the reaction gas: | 9.5 mg/m³ (under standard conditions), dry |

After several weeks of production, no damage to the refractory lining or to the combustors had occurred, nor to the atomizing burner according to the invention. The method is suitable for enhancing the performance of existing cleaving installations as well as for reducing the installation size when new installations are built.

The invention claimed is:

1. A method for the regeneration of residues containing sulfur in that a droplet stream containing the residue is introduced into a reactor and fed to a reaction zone consisting of hot flue gases that are generated through the combustion of a fuel, and heated in said reaction zone so that compounds of the residues containing sulfur are thermally cleaved, characterized in that a droplet stream containing fuel is introduced into the reactor simultaneously with the droplet stream containing the residue, and is fed into a pre-reaction zone that is created by feeding in an oxygen-rich gas stream, whereby the residue in the pre-reaction zone is partially thermally cleaved and subsequently fed into the reaction zones, wherein the residue is atomized using an atomizing burner having a central inner nozzle that feeds in the residue-fuel mixture and that is coaxially surrounded by an inert gas nozzle and by a ring-shaped nozzle that feeds the oxygen-rich gas stream as an oxygen-rich sheathing gas stream, whereby inert gas is fed through the inert gas nozzle.

2. The method according to claim 1, characterized in that a maximum temperature in the range between 800° C. and 1300° C. [1472° F. and 2372° F.], preferably between 850° C. and 1100° C. [1562° F. and 2012° F.], is set in the pre-reaction zone.

3. The method according to claim 1, characterized in that the oxygen content in the pre-reaction zone is set sub-stoichiometrically with respect to oxidizable components of the residue and of the fuel.

4. The method according to claim 1, characterized in that the residue and fuel are introduced into the reactor by means of an atomizing medium, whereby the atomizing medium is formed at least partially by the oxygen-rich gas stream.

5. The method according to claim 4, characterized in that a residue-fuel mixture in the form of a residue-fuel droplet stream is fed into the reactor.

6. The method according to claim 5, characterized in that the oxygen-rich gas stream surrounds and penetrates the residue-fuel droplet stream as a sheathing gas stream, thus creating the first reaction zone.

7. The method according to claim 6, characterized in that the sheathing gas stream is used at least partially as the secondary atomizing medium for the residue-fuel mixture.

8. The method according to claim 6, characterized in that the sheathing gas stream is used entirely as the secondary atomizing medium for the residue-fuel mixture.

9. The method according to claim 7, characterized in that the oxygen content in the sheathing gas stream is set between 25 vol.-% and 100 vol.-%.

10. The method according to claim 6, characterized in that the oxygen content in the sheathing gas stream is set between 25 vol.-% and 100 vol.-%.

11. The method according to claim 5, characterized in that the oxygen content in the sheathing gas stream is set between 25 vol.-% and 100 vol.-%.

12. The method according to claim 4, characterized in that the residue is atomized using an atomizing burner having a central inner nozzle that feeds in the residue-fuel mixture and that is coaxially surrounded by an inert gas nozzle and by a ring-shaped nozzle that feeds the oxygen-rich sheathing gas stream, whereby inert gas is fed through the inert gas nozzle.

13. The method according to claim 1, characterized in that the oxygen-rich gas stream comprises a pre-heated hot-air stream and an oxygen-rich gas stream that is handled separately from it.

14. The method according to claim 1, characterized in that the inner nozzle is made of a material which would oxidize readily at prevailing high temperatures upon contact with the oxygen-rich sheathing gas stream.

* * * * *